United States Patent [19]

Efstathiou et al.

[11] Patent Number: 4,676,988

[45] Date of Patent: Jun. 30, 1987

[54] LOW-ACID JUICE-MILK BEVERAGES, JUICE AND MILK COMPONENTS THEREFOR AND METHODS OF PREPARATION

[75] Inventors: John D. Efstathiou, Plymouth; Robert Dechaine, Minneapolis; Robert Zoss, Plymouth, all of Minn.

[73] Assignee: General Mills, Inc., Minneapolis, Minn.

[21] Appl. No.: 591,137

[22] Filed: Mar. 19, 1984

[51] Int. Cl.$^4$ .............................................. A23C 9/146
[52] U.S. Cl. .................................. 426/271; 426/491; 426/580; 426/592; 426/477; 426/330.2; 426/330.4; 426/330.5
[58] Field of Search ............... 426/271, 491, 580, 583, 426/584, 592, 519, 330.5, 477, 330.4, 330.2

[56] References Cited

U.S. PATENT DOCUMENTS

| | | |
|---|---|---|
| 1,066,153 | 7/1913 | Rueff .................................. 426/271 |
| 1,570,975 | 1/1926 | Sweeney ............................. 426/271 |
| 2,055,782 | 9/1936 | Baier ................................... 426/580 |
| 2,667,417 | 1/1954 | Delmouseë ......................... 426/271 |
| 2,707,152 | 1/1951 | Chaney et al. ..................... 426/271 |
| 2,708,632 | 5/1955 | Stimpson ............................ 426/271 |
| 2,708,633 | 5/1955 | Stimpson ............................ 426/271 |
| 2,818,342 | 12/1957 | Ransom . |
| 2,879,166 | 3/1959 | Wilcox ................................ 426/271 |
| 3,174,865 | 3/1965 | Johnston et al. . |
| 3,437,491 | 4/1969 | Peterson et al. ................... 426/271 |
| 3,625,702 | 12/1971 | Exler . |
| 3,753,724 | 8/1973 | Silby .................................... 426/592 |
| 3,764,710 | 10/1973 | Inagami et al. . |
| 3,801,717 | 4/1974 | Huffman ............................. 426/271 |
| 3,851,071 | 11/1974 | Roehrig et al. .................... 426/271 |
| 3,996,390 | 12/1976 | Igoe . |
| 4,031,264 | 6/1977 | Arolski et al. . |
| 4,061,792 | 12/1977 | Inagami et al. . |
| 4,078,092 | 3/1978 | Nishiyama . |
| 4,212,893 | 7/1980 | Takahata . |
| 4,352,828 | 10/1982 | Rialland et al. . |
| 4,435,439 | 3/1984 | Morris . |
| 4,520,036 | 5/1985 | Rialland et al. .................... 426/271 |

FOREIGN PATENT DOCUMENTS

| | | | |
|---|---|---|---|
| 117011 | 8/1984 | European Pat. Off. ............ 426/271 |
| 2814122 | 10/1979 | Fed. Rep. of Germany ...... 426/592 |
| 28393 | 9/1982 | Japan .................................. 426/271 |
| 08850 | 12/1982 | Japan .................................. 426/271 |
| 56663 | 4/1983 | Japan .................................. 426/271 |
| 143574 | 8/1984 | Japan .................................. 426/580 |

OTHER PUBLICATIONS

Food Engineering, Dec. 1982, Fruit Juice/Milk Beverage.
Japanese Patent Abstract filed 21-09-81 as J5 8051-880, Stable Fruit Drink Preparation Using Ultra-Filtered Fruit Juice.

*Primary Examiner*—Raymond N. Jones
*Assistant Examiner*—Carolyn Paden
*Attorney, Agent, or Firm*—John A. O'Toole

[57] ABSTRACT

Disclosed are juice-milk beverages exhibiting minimal curdling and/or precipitation; new juice components and milk components for such beverages; and ion exchange methods of preparing such components and beverages. The milk component is prepared by first decationizing milk by contacting with a cation exchanging resin to a pH of below 3.2 to 1.5, and then anion exchanging to a pH of 3.5 to 4.5. The juice component is decationized to a pH of 2.5 to 1.3, deanionized to a pH of 8-11.5, and then acidulated by cation exchange to a pH of 3.0 to 4.5. Blends of the juice and milk are then essentially homogenized and then optionally pasteurized or sterilized and/or carbonated to prepare the new beverages.

26 Claims, No Drawings

LOW-ACID JUICE-MILK BEVERAGES, JUICE AND MILK COMPONENTS THEREFOR AND METHODS OF PREPARATION

BACKGROUND OF THE INVENTION

1. Field of the Invention

The present invention relates to food products and to their methods of preparation. More particularly, the present invention relates to beverages comprising both juice and dairy products.

2. The Prior Art

Numerous efforts have been made in the past to provide beverages which combine dairy ingredients and juice ingredients, particularly fruit juices. Relatively large amounts of juice are required to give a characteristic juice flavor to the milk, particularly with relatively mild flavored juices such as orange juice. However, when the acidic juice fraction is added to milk in sufficient amounts so as to lower the milk pH from the natural pH of 6.4–6.7 to below the isoelectric point of the milk's casein protein, then the protein precipitates and/or curdles. Additionally, over time various precipitates can form. Collectively, these problems are referred to herein as "instability." Most previous art efforts have attempted to prepare juice-milk drinks using acidified or soured milk and especially acidified skim milk rather than sweet milk (i.e., milk at its natural pH).

Typically, such past efforts to prepare a sour beverage have employed an added stabilizer (see, for example, U.S. Pat. No. 4,212,893 issued July 15, 1980 to J. Takahata wherein locust bean gum is used as a stabilizer) or uses the pectin associated with the fruit or added pectin (see, U.S. Pat. No. 4,031,264 issued June 21, 1977 to Arolski et al.; U.S. Pat. No. 3,764,710 issued Oct. 2, 1973 to Inagami et al.; U.S. Pat. No. 3,625,702 issued Dec. 7, 1971 to H. Exler; U.S. Pat. No. 2,818,342 issued Dec. 31, 1957 to E. Ransom; and U.S. Pat. No. 3,174,864 issued Mar. 23, 1965 to Johnston et al.).

Still another approach has been to prepare drinks using only milk derived materials or milk fractions, i.e., materials not containing the proteins which would precipitate at lower pH values.

U.S. Pat. No. 4,061,792 (issued Dec. 6, 1977 to K. Inagami et al.) disclosed still another approach. There, fruit juices are first contacted with acidified solutions of proteins to react with juice tannins to form coagulums. The coagulums are then removed from the juice to yield tannin-free juice which it is taught can be added to acidified milk to provide sour juice-milk beverages with reduced curdling tendencies.

It has been surprisingly discovered that the stability problems are due in part to the various cations and also to the anions supplied from the several beverage constituents, i.e., from the various minerals. The present invention provides a demineralized, (i.e., decationized and deanionized and thus improved stability, juice-milk beverage compared to the prior art products, further provides both juice and milk components useful in the preparation of such beverages, and provides new methods of preparing both these components and the finished beverages. In one aspect, the improvement resides in the provision of a relatively high pH or "low-acid" beverage product compared to prior art products which nonetheless exhibits minimal undesirable curdling and/or precipitation even at high juice solids levels. The present invention also provides such relatively high pH beverages with high juice solids even with high protein levels. This is surprising since the curdling problems generally increase as either the protein level or juice solids level increases.

Even more importantly from a commercial standpoint, in one embodiment of the present invention, the improved stability juice-milk beverages contain no added ingredients, i.e., are free of added stabilizers, emulsifiers, acidulants or the like. Such beverages are perceived by the consumer as being "all-natural," thus more healthy, and are therefore more desirable than the products of the prior art.

In its method aspect, the present invention provides a surprising combination of ion exchange processing for the separate provision of a juice component and of a milk component. Although milk has been treated using a similar cation exchange (see, U.S. Pat. No. 4,352,828 issued Oct. 5, 1982 to Rialand et al.), the present invention employs both a cationic as well as a novel, subsequent anionic exchange treatment of the milk to prepare the present novel milk components with subsequent blending and treatment to provide the beverage products of the present inventions. With regard to the juice component, the present invention provides a novel cation/anion/cation exchange process to prepare the present juice component. Additionally, the present invention provides a method for preparing a juice-milk beverage.

SUMMARY OF THE INVENTION

In its composition aspect, the present invention relates to juice-milk beverages of improved stability characterized in part by a relatively high pH as well as to novel beverage components. The present beverages comprise: (a) a decationized, deanionized (or "demineralized") milk component; and (b) a decationized, deanionized pH reduced or "acidulated" juice component. The pH of the present beverages ranges from about 3.5 to 4.5. Notwithstanding the pH of the beverage being below the isoelectric point of casein, the present beverages nonetheless exhibit minimal curdling, or precipitation.

The present invention further provides a juice component useful in the preparation of juice-milk beverages of increased stability. The juice component comprises a deanionized, decationized vegetable or fruit juice having a buffer capacity of less than about 0.20 g./l. 0.1N NaOH.

The invention also provides a milk component useful in the preparation of juice-milk beverages of increased stability. The juice component comprises a deanionized, decationized milk having a pH of about 3.8 to 4.5 and a mineral content of less than 0.25 mg./l.

In its method aspect, the present invention relates to methods for preparing both the juice components and the milk-juice beverages. The components are prepared by cation exchange followed by anion exchange. After blending of the separately prepared ingredients, the blend is essentially homogenized and then optionally pasteurized or sterilized and/or carbonated to prepare the present beverages.

The present method of juice component preparation includes as essential steps in sequence of: (a) a first contacting juice with a cation exchanging resin to lower the pH to about 2.5 to 1.3; (b) contacting the juice with an anion exchanging resin to raise the pH to 8.0 to 11.15; and, in preferred embodiments, (c) a second contacting with a cation exchanging resin to lower the pH to 3.0 to 4.5.

The present method of milk component preparation includes as essential steps, in sequence: (a) contacting milk with a cation exchanging resin to lower the pH to about 3.2 to 1.5; and (b) contacting the milk with an anion exchanging resin to raise the pH to 3.5 to 4.5.

DETAILED DESCRIPTION OF THE INVENTION

The present invention relates to improved stability juice-milk beverages and to novel demineralized beverage components. The present beverages essentially comprise: (a) a decationized, deanionized milk component; and (b) a decationized, deanionized, acidulated juice component. In its method aspect, the present invention relates to methods for preparing such components as well as methods of beverage preparation. Beverage product composition, attributes and use as well as the product and components' preparation steps are described in detail as follows.

Throughout the specification and claims, percentages and ratios are by weight, and temperatures in degrees Fahrenheit, unless otherwise indicated.

MILK COMPONENT

A decationized, deanionized milk component is the principal component of the present juice-milk beverages. The milk component is prepared by the cation/anion ion exchange treatment described below. It is essential to employ this new milk component in order to realize the reduced curdling and/or precipitation advantages of the present beverages. While not wishing to be bound by the present theory, it is speculated herein that the decationization process removes or substantially reduces the divalent minerals from the milk, i.e., the magnesium salts and the calcium salts, which are primarily responsible for the undesirable curdling problems. Incidentally, the decationization process additionally removes the monovalent cations, i.e., the potassium and sodium cations, but it is believed that these cations are much less important, if at all, to the instability problems.

The present invention finds usefulness with all types of mammalian milk (e.g., goat's milk, mare's milk, ewe's milk). Of course, the present invention is especially useful with bovine milk and the following description will generally refer to cow's milk. However, it is also contemplated to use vegetable milks, e.g., bean milks such as soybean milk, although the instability problems are less severe with these types of milk. Also useful herein are filled milks (i.e., milks with fats other than butterfat).

Skim milk (i.e., having a butterfat content of or about 0.1%) is the preferred starting material although whole milk (3.5% butterfat) or other reduced fat milks can be ion exchange treated. However, the butterfat in raw milk tends to clog the ion exchange resins leading to reduced through-put rates and also to butterfat losses. Thus, it is preferred to skim the milk prior to ion exchange treatment and then to recombine the skimmed fat with the prepared decationized, deanionized milk. Alternatively, if the milk is not to be skimmed, then homogenizing the milk also substantially decreases the problem of using milks containing significant butterfat amounts.

The milk is first essentially decationized using conventional cation exchange resins and techniques. A good description of milk decationization processes and techniques is described in U.S. Pat. No. 4,352,828 (issued Oct. 5, 1982) which is incorporated herein by reference. Generally, food grade, conventional type cation exchanging resins in acid form such as are used in normal demineralization processes can be used as exchanging resins including those used for the demineralization of whey. For example, useful herein are strongly acidic cation exchanging resins with polystyrene skeletons, carrying sulfonic acid groups presented in gel or macroporous solid form. Macroporous type resins are preferred to gel type because of reduced problems of blockage by fat.

Suitable food grade cation exchange resins for use herein include:
1. Diamond Shamrock: Duolite C-20 TM
2. Dow Chemical: HCR-S-H TM
3. Dow Chemical: MSC-1-H TM As the cations are stripped from the milk and the pH drops to approach the isoelectric value of casein of apx. 4.7, the casein would precipitate unless the milk is maintained at a temperature of 0° to 4° C. The milk is kept in contact with the resins until the milk pH is below or equal to 3.2, preferably $\leq 2.8$ and most preferably $\leq 1.9$. However, the pH should not be lowered below a pH of about 1.5. When batch processing is employed, the pH end point is obtained by adding sufficient amounts of the exchange resin and maintaining contact for about 1 to 10 minutes. The contact period can be reduced with stirring. The volume ratio of the milk treated to the exchanging resin is preferably between 5:1 to 15:1. Thereafter, the exchange resin is separated from the acidulated decationized milk so formed.

The milk treated with a cation-exchanging resin is an acidulated "decationized" milk (i.e., a milk containing only traces of calcium, sodium, potassium cations), with a pH which is below or equal to 3.8 and therefore clearly below the isoelectric point of casein (whereas ordinary milk has a pH of about 6.7) and containing all the proteins and the lactose of ordinary milk. Its mineral element content is less than 4 g./l.; the Ca/P ratio is below 0.5 (against 1.3 for ordinary milk).

The treatment of milk with a cation-exchanging resin can be conducted by techniques known per se, either by percolating the milk through a fixed bed of cation-exchanging resins, or by counter-current flow of the milk with the cation-exchanging resin, or else by mechanical or pneumatic agitation of the mixture of milk and cation-exchanging resin, or by any other appropriate means.

After saturation of the cation-exchanging resin by the cations of the milk, the exchanging resin is regenerated by an acid. The regenerated exchanging resin is then rinsed with decationized water, and the resin is then ready for a new cycle of treatment, i.e., in acid form.

Thereafter, the milk is essentially subjected to an anion exchange treatment to raise the pH to between about 3.5 to about 4.6, preferably about 4.1 to 4.4, by contacting the milk with an anion exchange resin in base form to realize the deanionized and decationized milk component of the present invention. Such a milk component is referred to herein as a "demineralized" milk component. Other techniques for raising the pH such as adding mineral or organic acids, or mixing with non-treated milk sufficient to raise the pH of the mixture to the desired range cannot be used as substitutes for the essential anion exchange treatment herein. While not wishing to be bound by the proposed theory, it is speculated herein first that the anion exchange absorbs certain whey protein fractions and various anions, e.g., phosphates, citrates, chlorides, etc., each of which contribute to the undesirable instability and, secondly, that alternative pH raising techniques tend merely to add back the undesirable minerals rather than absorb anions to accomplish pH increases. Minor adjustment using, e.g., NaOH or citric acid, e.g., ±1.5 pH value, can, however, be made without losing the advantages of the present invention. Additionally, the selected pH range for the milk component is important to the realization of important beverage attributes. Beverages having acidic milk components at about the isoelectric value of 4.7 can exhibit an undesirable chalky mouthfeel, although such mouthfeel can be compensated modestly by increasing the beverage fat level. Employment of milks having higher pH, e.g., greater than 5.0 can be used which are not chalky but beverages prepared therefrom lack organoleptically desirable astringency and are thus not preferred.

The anion exchange treatment is comparable to the cation exchange treatment except for the substitution of suitable anion exchange resins. Suitable anion exchange resins include:
 1. Dow Chemical: MWA-1 TM
 2. Dow Chemical: DOW-66 TM
 3. Diamond Shamrock: ES 392 TM
 4. Diamond Shamrock: A-7 TM
 5. Diamond Shamrock: ES 291 TM Of course, regeneration of the anion exchange resins employ strong alkalies, e.g., sodium hydroxide, and washing with distilled water to return the anion resin to base form. From the foregoing, the skilled artisan will appreciate that the sequence of ion exchange treatment of the milk component cannot be reversed.

Depending upon the attributes of the finished products desired, the milk component can be optionally concentrated. The composition of milk and orange juice, for example, are:

|  | Milk | Juice | Milk/Juice Beverage |
|---|---|---|---|
| Moisture | 87.4% | 88.2% | 75.7% |
| Fat | 3.5 | 0.7 | 4.2 |
| Protein | 3.5 | 0.2 | 3.7 |
| Carbohydrate | 4.9 | 10.4 | 15.3 |
| Ash | 0.7 | 0.4 | 1.1 |
|  | 100.0% | 100.0% | 100.0% |

For example, if it is desired to prepare a beverage having a protein level equivalent to that of raw milk, i.e., 3.9%, as well as other milk constituents e.g., 3.5% butterfat, and also desired that the beverage contain juice solids also at levels comparable to raw juice, then the water associated with the to-be-described juice component must be removed. The excess water can be removed from the combined beverage or from the milk component prior to blending with the juice.

Thus, if 100 g. of milk component herein and 100 g. of juice component herein were used to make 100 g. of beverage having the same fat, protein, lactose, glucose, etc. levels as the original milk or juice, then apx. 100 g. of water must be removed. The milk can be concentrated to double its strength, i.e., 2×, so that upon blending with the juice, the desired solids level is obtained. Of course, the juice may also be concentrated prior to treatment as described in detail below.

Any conventional milk concentration technique can be used herein including thermal concentration with or without vacuum, reverse osmosis ("R/O"), ultrafiltration ("UF"), etc., or combinations thereof although UF or R/O are the preferred concentration techniques for use herein. The concentration step can be practiced, in whole or in part, either before or after the ion exchange treatment. In concentrating milk, UF provides the advantage of partial reduction in the soluble salts level thus reducing the time, cost, needed capacity, etc. of the cation exchange operation. However, the lactose level is also reduced. Using R/O to concentrate the milk has the advantage of minimizing lactose losses, but does not provide the reductions in the level of soluble salts as does UF. If highly concentrated milk components are to be prepared however, i.e., greater than 2×, then the concentration step is desirably practiced after ion exchange due to the reduced flux or through-put rates of treating concentrated milk.

As noted above, while whole milk can be ion exchange treated to prepare the milk component, it is preferred to first skim the fat from the milk and to treat only the skimmed milk. The butterfat level of the present milk component can be adjusted by combining with appropriate amounts of untreated sources of butterfat, e.g., light cream, 15% butterfat or heavy cream, to realize milk components of any desired butterfat level, whether reduced fat, e.g., 1%, 2%, or whole milk, i.e., 3.5% or 3.7%.

The present milk component is highly resistant to both precipitation and curdling over a wide pH range and can be thus used as a component in a wide variety of foods of various pH's in addition to its principal use as a component for the present beverages.

JUICE COMPONENT

An ion exchange treated juice component is also an essential component of the present juice-milk beverages. Suitable for use herein are juices derived from all manner of fruits, vegetables, and mixtures thereof. Preferred for use herein are fruit juices, especially berry juices, e.g., strawberry, blackberry; and citrus juices, e.g., grapefruit, lemon, and orange juices. Especially preferred for use herein is orange juice.

In typical commercial operation, juices are received as concentrates, i.e., at 45° to 70° Brix rather than the 7° to 13° Brix of raw juice. For operation herein, the juice concentrate is first diluted with water to 18° to 23° Brix. Of course, due to the conventional thermal evaporation, any residual pectinase has been inactivated. In preferred operations, the juices are filtered or clarified prior to ion exchange treatment to remove any undissolved solids.

The present juice component preparation ion exchange process involves the essential step sequence of cation exchange, anion exchange, and then optionally, but preferably, a second cation exchange. After solids concentration adjustment, the juice is subjected to a first decationization by contracting with a cation exchange resin in a manner similar to that described for the milk component. Resin manufacturers distinguish between "weak" and "strong" resins based on the ionic strength of the resins. Highly preferred for use herein for treating the juice fraction are "strong" cation resins. "Strong" resins minimize the undesirable stripping of flavor and color constituents of the juice. Exemplary preferred cation resins for use herein include:
 1. Diamond Shamrock: Duolite C-20 TM
 2. Dow Chemical: HCR-S-H TM The decationization is continued until the juice pH is below or equal to 2.5 but greater than 1.5, preferably 2.0 to 1.8, to produce a decationized, acidified juice. Thereafter, the juice is subjected to an anion exchange to raise the pH of the juice to equal or exceed 8.0 and preferably to equal or exceed 10.0 but less than about 11.5 to realize a decationized, deanionized juice. If desired, the juice so prepared can be used in the present beverages. Finally, the juice is then optionally subjected to a second cation exchange step to reduce its pH comparable to that of raw juice. While the treated juice has a pH comparable to that of raw juice, the treated juice's acidity or buffering capacity has been reduced substantially, e.g., from an original value of 3.1 g./l. 0.1N NaOH to less than about 0.2 g./l. 0.1N NaOH, preferably 0.20 to 0.15 g./l. Such reductions are essential to the realization of a juice component which is useful as an ingredient in juice-milk beverages having reduced curdling features. When a concentrated juice is treated with the resins substantial absorption of sugars occurs. Solids losses can range up to 40%. However, the sugars can easily be recovered during the regeneration cycle of the resins by washing with distilled water. The second cation exchange step enables the realization of juice component of the present invention having reduced pH's which pH's are desirable for taste considerations. Alternatively, the juice pH can be adjusted using minor amounts of an edible organic acid, e.g., malic, succinic, tartaric, lactic, citric and the like. Preferred for use are the pure acids, as opposed to their salts, especially citric acid. Due to the sharp reductions in buffer capacity, only very modest amounts of acids are required to make the pH adjustments.

BEVERAGE PREPARATION

The juice component and the milk component each as separately prepared above as well as any optional components are then blended to form a uniform juice-milk blend. Of course, the exact levels of milk component and juice component will depend upon the beverage attributes desired. One preferred embodiment of the present invention comprises an orange juice-cow's milk beverage only having protein, fat, lactose, fructose, etc. levels comparable to raw milk and also to orange juice as given above. Such a beverage is thus substantially free of any emulsifiers, added sweeteners, thickeners, added flavors or the like.

Due to the reductions in the acidity of the components herein, the components can be combined.

Other embodiments of the present beverages, however, can additionally comprise a variety of optional ingredients which render the beverages more organoleptically, nutritionally or aesthetically desirable. Such optional ingredients can include minor amounts (i.e., 0.1% to 3%) each of vitamins, flavors, preservatives, thickeners, flavor enhancers, and the like. Additionally, the present beverages can contain about 0.1% to 10% of such materials as sweeteners, bulk flavors (e.g., chocolate), and added butterfat.

An advantage of the present beverage is that even at the low pH's resulting from the use of high levels of juice component, the beverage is resistant to curdling and/or precipitation.

More surprisingly, the milk component, and the beverage component can each be blended with any of a variety of distilled spirits, e.g., whiskeys, such as Scotch, Irish, Kentucky, etc., yet exhibit minimal curdling or precipitation properties. Thus, alcohol-milk protein precipitation stability problems are also minimized.

Thereafter, the blend is essentially homogenized at 2,000 to 5,000 psi and 150° to 180° F. The homogenization step disperses the fat and flavor constituents. After homogenization, the beverages are packaged, pasteurized or sterilized, cooled, and optionally lightly or fully carbonated, sealed and distributed in conventional manner. By "lightly carbonated" herein it is meant to a given volume of the present beverage, an equivalent volume of $CO_2$ is added. By "fully carbonated" herein it is meant that to a given volume of the present beverage, three equivalent volumes of $CO_2$ is added. Highly preferred for use herein are lightly carbonated beverages.

The following examples are offered to further illustrate the invention disclosed herein.

EXAMPLE 1

200 Grams aliquots of skim milk (0.1% butterfat) are cooled to 33° to 38° F. and were admixed with a food grade strongly acidic, cation exchanging resin in acid form. The resin employed was that marketed under the trade name MSC-1-H by Dow Chemicals and is a macroporous, strongly acidic type resin. The milk and resin were kept in contact for one hour while the milk temperature was maintained with an ice bath. The ratios of milk to resin treated and the final pH obtained included:

| Wt. Ratio of Milk:Resin | pH at 1 Hour |
| --- | --- |
| 10:1 | 1.78 |
| 15:1 | 1.99 |
| 20:1 | 2.50 |
| 30:1 | 3.60 |

A control sample and the 15:1 sample had the following assay:

| Sample | mg/100 g | | | | pH |
| --- | --- | --- | --- | --- | --- |
| | Ca | Mg | K | Na | |
| Control | 149.41 | 10.8 | 149.4 | 48.8 | 6.87 |
| 15:1 | 10.9 | 1.3 | 4.2 | 8.2 | 1.97 |

The control and the 15:1 milk where each tested for total protein and determined that no significant protein losses occurred resulting from the cation exchange step.

Skim milk prepared as above and having a pH of 1.9 is selected for anion exchange with a resin marketed under the trade name of "Duolite A-7" by Diamond Shamrock Corp. (a "weak base" type resin). The method of treatment was the same as above. 200 g. of milk is admixed with 20 g. of the resin and allowed to remain in contact for just under one hour until a pH of 4.2 is obtained whereupon the decationized, deanionized milk so prepared and resin are then separated.

Homogenized low-fat milk (2% butterfat) is treated in a substantially similar manner, e.g., same resins; weight ratio of milk to resin, etc. with substantially similar results in terms of final pH and reduction in cation concentrations.

EXAMPLE 2

400 ml. of skim milk is concentrated to 2× using ultrafiltration. The cold milk was fed to a Millipore Corp. cassette—U.F. bench scale unit equipped with a 30,000 mol. weight cut-off membrane. The 200 ml. of the 2× milk obtained is chilled in an ice bath to 35° F. and then blended with cation exchange resin in acid form in a weight ratio of 5:1 and the exposure is continued until a pH of 2.5 is obtained. Thereafter, the cation exchange treated milk is then contacted with 20 g. of an anion exchange resin, (marketed under the trade name of Duolite A-7 ™ by Diamond Shamrock Co.) for about 50 minutes until a pH of about 3.9 is obtained.

EXAMPLE 3

A volume pineapple juice concentrate having a pH of about 3.5° and 44° Brix is diluted with an equivalent volume of distilled water to 22° Brix. The diluted concentrate is passed through a batch centrifuge equipped with a 15 micron filter bag. The resultant clarified filtrate is pumped through a first column packed with 0.2 ft.$^3$ (apx. 20 lbs.) of a food grade cation exchanging resin in acid form marketed under the trade name of Duolite C-20 by Diamond Shamrock Corp., and a second column packed with 0.3 ft.$^3$ (apx. 30 lbs.) of the same resin. The flow rate is adjusted such that the exit pH of the juice from the second column is about 1.8. The flow rate is about 0.5 gal./min. The decationized juice so prepared is then passed through a first column or stage packed with 0.1 ft.$^3$ (apx. 10 lbs.) and a second column also packed with apx. 0.1 ft.$^3$ of an anion exchange resin marketed under the trade name of Duolite A-7 by Diamond Shamrock Corp. The exit pH is about 10.9. The cation exchange column requires regeneration after about 200 gal. of the juice has been treated. The anion exchange columns requires regeneration after about 50 gal. of the juice is treated.

The juice is then passed through another cation exchange column packed with 0.1 ft.$^3$ of the same cation exchange resin. The flow rate is adjusted such that the pH of the juice is about 4.2.

A control sample and a treated sample of the decationized, deanionized, juice is taken prior to final pH adjustment by cation exchange were analyzed and have the following assay:

| Sample | Titratable Acidity (g/l citric acid) | pH | mg./100 g. | | | |
|---|---|---|---|---|---|---|
| | | | Ca | Mg. | K. | Na |
| Control | 10.76 | 3.46 | 19.4 | 2.5 | 150 | 11 |
| Treated | 0.00 | 10.89 | 1.80 | <.01 | 0.8 | 0.9 |

The assay shows that the juice has been substantially demineralized and exhibits almost no titratable acidity.

EXAMPLE 4

20 Gallons of orange juice concentrate at 33° Brix, and a pH of 3.78 is pumped at a rate of 250 ml/min. to three, six ft. glass columns arranged in series. The first column is packed with apx. 0.5 ft.$^3$ of a cation exchanging resin marketed under the trade name of Duolite C-20. The second column is packed, apx. 0.25 ft$^3$ with an anion exchanging resin marketed under the trade name of Duolite A-7. The third column is packed with apx. 0.1–0.2 ft.$^3$ of a strong acid cation exchanging resin marketed under the trade name of Duolite ES 291. Each of the resins are available from Diamond Shamrock Corp.

The flow rate of the orange juice concentrate is 250 ml/min. The decationized juice after exiting the first column has a pH of 2.3. The decationized, deanionized juice after exiting the second column has a pH of 8.0.

After exiting the third column, the juice has a pH of about 3.3 and is about 18° Brix.

EXAMPLE 5

A beverage of the present invention is prepared having the following formulation:

| Ingredient | Parts by Weight |
|---|---|
| Skim milk (per Example 1) | 50 |
| Orange juice (per Example 4) | 50 |
| Butterfat | 3 |
| Flavor* (2 drops per 1,000 g.) No. 1598067 | |

*marketed under the trade name CITRIFF by International Flavor and Fragrances.

A 1,000 g. batch of the above formulation is prepared and found to have a pH of 3.5. The pH is adjusted to 4.3 by adding an appropriate amount of 1N NaOH solution.

The beverage is then heated to 150° to 170° F. in a plate heat exchanger and homogenized at a pressure of apx. 2,500 psi.

Thereafter, the beverage is heated in a tubular high temperature heat exchanger to 205° to 215° F. and held about 15–20 seconds for sterilization. A portion of the product is then cooled to 110° and aseptically packaged.

A portion of the sterilized beverage is cooled to 34°, and carbonated in a batch carbonater until about 2.3 volumes of $CO_2$ is added as measured by a Zahn and Nagel Co. pressure tester. Thereafter, the beverage is conventionally bottled. Neither the aseptically packaged or carbonate bottled beverages exhibited any curdling or protein precipitation.

Products of substantially similar stability attributes are realized when the orange juice component is substituted with the pineapple juice as prepared in Example 2 except for the substitution of the flavorant WONF-F207-1 ™ by FlavTek, Inc. for the IFF flavor.

What is claimed is:

1. A method for preparing a juice and milk product of improved stability, comprising the steps of:

A. contacting milk having a temperature of 0° to 4° C. with a strong cation-exchanging resin in acid form for the time sufficient to lower the pH of the milk between 1.5 and 3.2 whereby the milk cations are exchanged with hydrogen ions and then separating the milk from the resin to form decationized milk and cation-loaded, cation-exchanging resin;

B. contacting the decationized milk with a strong anion-exchanging resin in base form, while maintaining the milk temperature at 0°–4° C. for a time sufficient to raise the pH of the milk to a value of about 3.5 to 4.5 whereby the anions are absorbed by the resin and then separating the milk and resin to form a deanionized, decationized milk having a mineral content of less than 0.25 g/l;

C. contacting fruit or vegetable juice with a strong cation-exchanging resin in acid form for a time sufficient to lower the pH of the juice to 1.3 to 2.5 and then separating the juice and resin to form decationized juice and cation-loaded, cation-exchanging resin;

D. contacting the decationized juice with a strong anion exchanging resin in base form for a time sufficient to raise the pH of the juice to a value of about 8.0 to 11.5 and then separating the juice and the resin to form a deanionized, decationized juice;

F. contacting the juice with a strong deanionized resin for a period of time sufficient to lower the pH of the juice to a value of about 3.0 to 4.5 and separating the juice and resin to form an acidulated deanionized, decationized juice having a buffer capacity of less than about 0.20 g./l. 0.1N NaOH;

F. blending the juice and the milk to form a juice-milk blend; and

G. homogenizing the juice-milk blend to form a juice milk beverage.

2. The method of claim 1 wherein the milk of Step A is placed in contact with the cation-exchanging resin for the time period necessary to lower the pH of the milk to between about 1.5 to 2.8.

3. The method of claim 3 wherein the juice of Step C is placed in contact with the cation-exchanging resin for the time period necessary to lower the pH of the juice to between 1.5 to 2.0.

4. The method of claim 3 additionally comprising the step of adjusting the pH of the blend of Step F with a food grade strong base to a value of 5.0 to 6.5.

5. The method of claim 3 additionally comprising the step of adjusting the pH of the blend of Step F with citric acid to a value of 3.5 to 4.5.

6. The method of claim 3 comprising the step of carbonating the blend with between about 1 to 2.5 equivalent volumes of carbon dioxide.

7. The method of claim 3 wherein the milk is skim milk.

8. The method of claim 7 additionally comprising the step of, prior to the homogenization step, adding to the blend the deanionized, decationized milk, light or heavy cream in amounts sufficient to provide the blend having up to about 3.7% butterfat.

9. The method of claim 3 wherein in step B the decationized milk is contacted with a strong anion-exchanging resin in base form for a time sufficient to raise the pH of the milk to a value of 4.1 to 4.4.

10. The method of claim 9 wherein the milk has a butterfat content of about 0.1 to 3.7% and the milk is homogenized.

11. The method of claim 10 wherein the milk is concentrated up to about twice the solids level of native milk.

12. The method of claim 11 wherein the juice has a concentration of about 18° to 23° Brix.

13. The method of claim 12 wherein in step C the juice is contacted with a strong cation-exchanging resin in acid form for a time sufficient to lower the pH of the juice to a value of about 1.8 to 2.0.

14. The method of claim 13 wherein in step D the decationized juice is contacted with a strong anion-exchanging resin in base form for a time sufficient to raise the pH of the juice to a value of about 10 to 11.5.

15. A beverage exhibiting minimal instability, consisting essentially of a blend of:

A. a decationized, deanionized milk having a pH of about 3.8 to 4.5 and a mineral content of less than about 0.25 m. g./l.; and B. a decationized, deanionized acidulated vegetable or fruit juice having a pH of about 3.2 to 11.5 and a buffer capacity of less than about 0.20 g./l. 0.1N NaOH and, wherein said beverage is free of added stabilizers, emulsifiers and acidulants.

16. The beverage of claim 15, wherein the juice component has a pH of about 3.2 to 3.6.

17. The beverage of claim 16 wherein the juice component and the milk component each comprise about 50% of the beverage.

18. The beverage of claim 17 comprising
about 75% moisture
about 4.2% fat
about 3.7% total protein
about 15.3% total carbohydrate
about 1.1% total ash.

19. The beverage of claim 12 wherein the milk component is skim milk.

20. The beverage of claim 19 wherein the butterfat content of the beverage ranges between about 1% to 3.7%.

21. The beverage of claim 20 wherein the juice is orange juice.

22. The beverage of claim 20 wherein the juice is pineapple juice.

23. The beverage of claim 20 wherein the beverage has a pH of about 3.5 to 4.5.

24. The beverage of claim 23 carbonated with between about 1 to 2.5 equivalent volumes of $CO_2$.

25. The beverage of claim 24 additionally comprising a distilled spirit.

26. The beverage of claim 16 wherein the milk has a butterfat content of about 0.1% to 3.7% by weight of the milk.

* * * * *